Oct. 16, 1934.  G. R. BROPHY ET AL  1,977,335
BEARING AND METHOD OF MAKING SAME
Filed Dec. 17, 1932
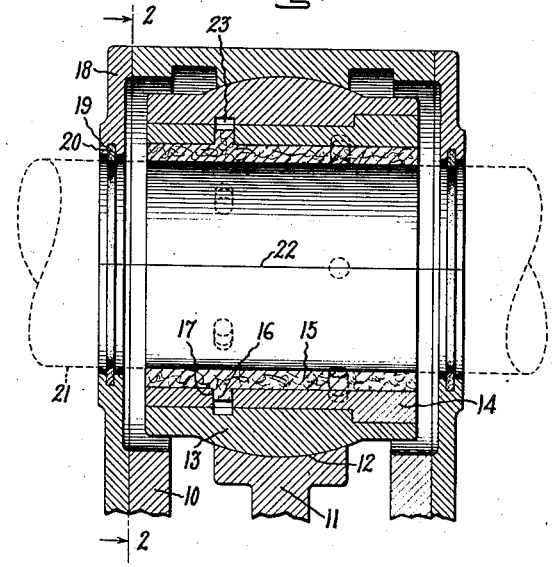
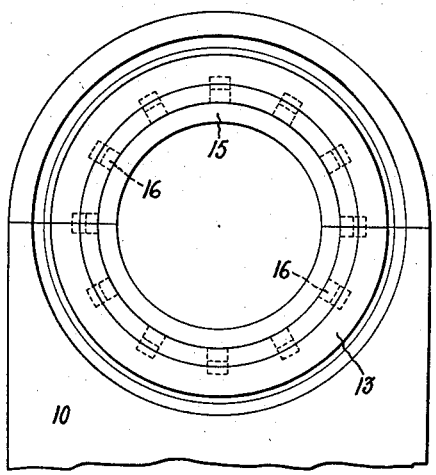
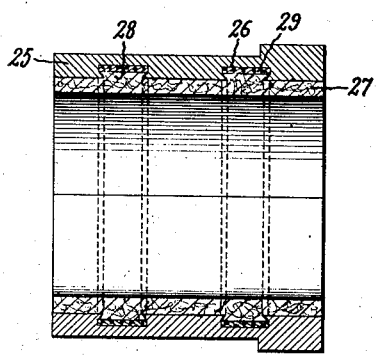
Inventors:
Gerald R. Brophy,
Edward A. Smith,
by Charles E. Tullar
Their Attorney.

Patented Oct. 16, 1934

1,977,335

UNITED STATES PATENT OFFICE 1,977,335

BEARING AND METHOD OF MAKING SAME

Gerald R. Brophy and Edward A. Smith, Schenectady, N. Y., assignors to General Electric Company, a corporation of New York Application December 17, 1932, Serial No. 647,782

4 Claims. (Cl. 29—149.5)

The present invention relates to bearings for supporting rotary shafts, and more particularly to the kind of bearing which is provided with a lining made of bearing metal such as Babbitt metal held by a backing made of steel. The lining is anchored in the backing by means of projections of the lining entering holes or recesses in the backing. The bearing metal has a co-efficient of expansion which is about twice the coefficient of expansion of steel serving as backing. The difference in expansion of the two materials has led to certain difficulties during the operation of bearings of this kind. More expansion of the lining takes places at the portions where the lining is provided with projections entering grooves or holes in the backing. Owing to the fact that relative expansion between the lining and the backing can only take place in a radially inward direction, the portions of the lining provided with projections expand more inwardly than the remaining portions and thus raise lumps at each anchorage on the inner surface of the lining. This results in local areas of extreme pressure, failure of lubrication and consequent wiping.

The object of the present invention is to provide an improved bearing construction to overcome the aforementioned drawback caused by the anchorages of the lining due to the relative expansion between the lining material and the backing material.

In accordance with our invention, we provide holes or recesses in the backing for receiving projections of the lining to anchor the lining in the backing. These holes are made larger in radial direction so that they extend beyond the end surfaces of the projections whereby during operation of the bearing the projections may expand radially outward in the holes or grooves.

In cases where the bearing metal is cast into grooves such as dovetail grooves of the backing, we provide in the bottom of these grooves a compressible material such as asbestos, cork or the like.

For a more complete understanding of what we consider to be novel and our invention, attention is directed to the following description and the claims appended thereto in connection with the accompanying drawing.

In the drawing, Fig. 1 is a section of a bearing embodying our invention; Fig. 2 is a front view of Fig. 1 taken along line 2—2 of Fig. 1, and Fig. 3 embodies a modification according to our invention.

The bearing illustrated in Figs. 1 and 2 comprises an outer casing 10 including a support 11 having a spherically-shaped surface 12 for supporting a pillow block 13. Fastened to the latter is a backing 14 which may be made of steel. Provided on the interior of the backing is a lining 15 which is anchored to the backing by projections 16 entering holes 17 in the backing. A plate 18 is fastened by any suitable means, not shown, to each end of the shell or casing. Each plate has a recess 19 for receiving a packing 20, which at its inner surface bears against a shaft 21 supported by the bearing. The different parts are split along a horiozntal line indicated at 22 to permit easy assembling and dismantling of the structure.

The construction so far described is typical of any kind of bearing supporting a rotary shaft. It will be readily seen that more expansion of the bearing metal or lining takes place in radial direction at the portions where the lining is provided with projections 16. In order to prevent the formation of lumps at the bearing surface near said anchorages, we provide holes in the backings which extend beyond the end surfaces of the projections, or, from another viewpoint, we make the projections shorter than the holes. In cases where the bearing lining is cast into the backing this shortening may be easily accomplished by counterboring the projections from the outer surface of the backing. In addition to this provision we may provide the pillow block with holes or recesses 23, registering with the holes or grooves 17 in the backing.

Whereas in the embodiment of Fig. 1 the holes in the pillow block receiving projections of the bearing lining extend through the wall of the pillow block, we have shown in Fig. 3 another arrangement in which recesses of dovetail shape are provided in the inner surface of a backing for receiving dovetail projections of the lining. More specifically, a backing 25 is provided with a plurality of annular grooves 26 having dovetail form. A lining 27 is supported by and rigidly fastened to the backing 25 by means of dovetail-shaped projections 28 extending into the grooves 26. To permit these projections during operation to expand radially outwardly, we provide in the bottom part of the grooves 26 a compressible material such as cork or asbestos 29. The provision of the compressible material in the bottom portion of the grooves 26 permits a simple method of manufacturing the bearing by casting the lining material into the backing.

What we claim as new and desire to secure by Letters Patent of the United States, is:—

1. In a bearing, a pillow block, a steel backing held in the pillow block and having a plurality of holes, and a lining on the backing having projections extending into the holes, the pillow block having recesses registering with said holes and extending beyond the ends of the projections.

2. In a bearing, a backing having recesses, a compressible material filling an outer portion of the recesses, and a bearing lining having projections, the projections filling the remaining portions of the recesses whereby the projections may expand in radial direction away from the bearing surface under compression of said material.

3. The method of producing a bearing including a backing and a lining having a projection free to expand radially away from the bearing surface, said method including the steps of forming a groove in the backing, partly filling the groove with a compressible material, and providing the backing with a lining having a projection extending into the groove.

4. The method of producing a bearing including a backing and a projection free to expand radially away from the bearing surface, said method including the steps of forming a recess in the backing, casting a lining onto the backing with a projection of the lining filling the recess, and counterboring the projection of the lining from outside the backing to permit the projection to expand freely into the recess during relative expansion of the lining and the backing whereby the raising of lumps on the bearing surface of the lining is substantially eliminated.

GERALD R. BROPHY.
EDWARD A. SMITH.